United States Patent
Norris

(10) Patent No.: US 6,718,328 B1
(45) Date of Patent: Apr. 6, 2004

(54) SYSTEM AND METHOD FOR PROVIDING CONTROLLED AND SECURED ACCESS TO NETWORK RESOURCES

(75) Inventor: Charles Leslie Norris, San Diego, CA (US)

(73) Assignee: Akamai Technologies, Inc., Cambridge, MA (US)

( * ) Notice: Subject to any disclaimer, the term of this patent is extended or adjusted under 35 U.S.C. 154(b) by 0 days.

(21) Appl. No.: 09/514,427

(22) Filed: Feb. 28, 2000

(51) Int. Cl.⁷ .............................................. G06F 17/30
(52) U.S. Cl. ................ 707/9; 707/1; 707/10; 709/203; 709/225; 713/202
(58) Field of Search ............... 707/9, 1, 229, 707/10, 2; 705/35, 64, 65; 709/225, 203, 219; 713/200, 201, 202, 156, 182, 185, 172

(56) References Cited

U.S. PATENT DOCUMENTS

| | | | | |
|---|---|---|---|---|
| 5,708,780 A | * | 1/1998 | Levergood et al. | 709/229 |
| 5,963,917 A | * | 10/1999 | Ogram | 705/26 |
| 5,982,445 A | * | 11/1999 | Eyer et al. | 348/461 |
| 5,991,738 A | * | 11/1999 | Ogram | 705/26 |
| 6,041,357 A | * | 3/2000 | Kunzelman et al. | 709/228 |
| 6,102,406 A | * | 8/2000 | Miles et al. | 273/430 |
| 6,173,406 B1 | * | 1/2001 | Wang et al. | 713/201 |
| 6,192,407 B1 | | 2/2001 | Smith et al. | 709/229 |
| 6,223,292 B1 | * | 4/2001 | Dean et al. | 713/201 |
| 6,269,394 B1 | * | 7/2001 | Kenner et al. | 709/217 |
| 6,286,001 B1 | * | 9/2001 | Walker et al. | 709/9 |
| 6,314,425 B1 | * | 11/2001 | Serbinis et al. | 707/10 |
| 6,349,288 B1 | * | 2/2002 | Barber | 705/26 |
| 6,360,254 B1 | * | 3/2002 | Linden et al. | 709/219 |

* cited by examiner

Primary Examiner—John Breene
Assistant Examiner—Cheryl Lewis
(74) Attorney, Agent, or Firm—David H. Judson; Locke Liddell & Sapp LLP

(57) ABSTRACT

A system and method for controlling access to content on a network computer. The computer may be a stand-alone single server computer or part of a distributed computer network that is connected to the Internet, intranet, or any other network. The present invention provides a means for a publisher or an owner of content to control access to the content even on a distributed network, i.e., multiple computers storing and providing access to the content. According to the present invention, a user initially receives a token from the publisher or the owner. A content server then receives the token from the user. The content server is configured to recognize requests for content that requires authentication, process the token, and verify the validity of the token. If the token is valid, the server delivers the content to the user. If the token is invalid, the server denies the user access to the content. The present invention provides secured access to restricted contents, such as, for example, pay-per-view websites and movies, and members-only content in an efficient way.

14 Claims, 4 Drawing Sheets

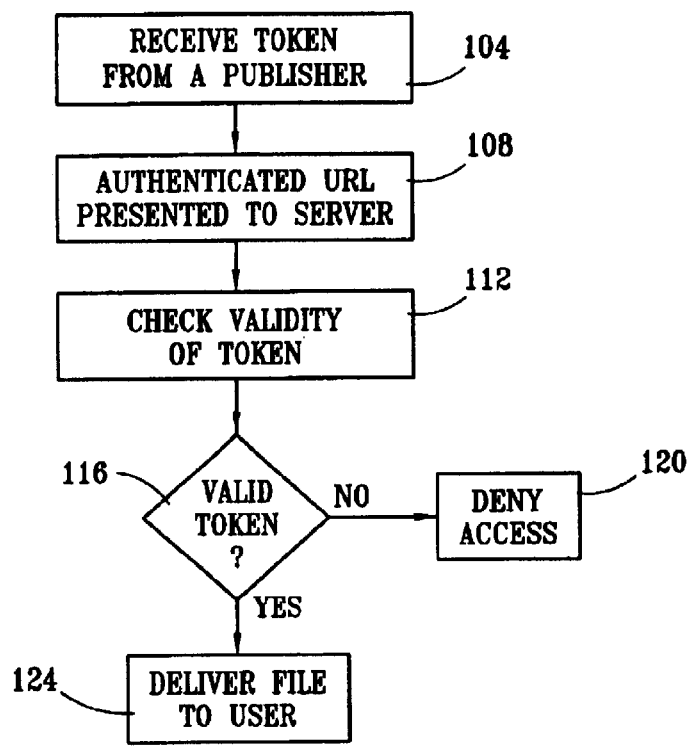
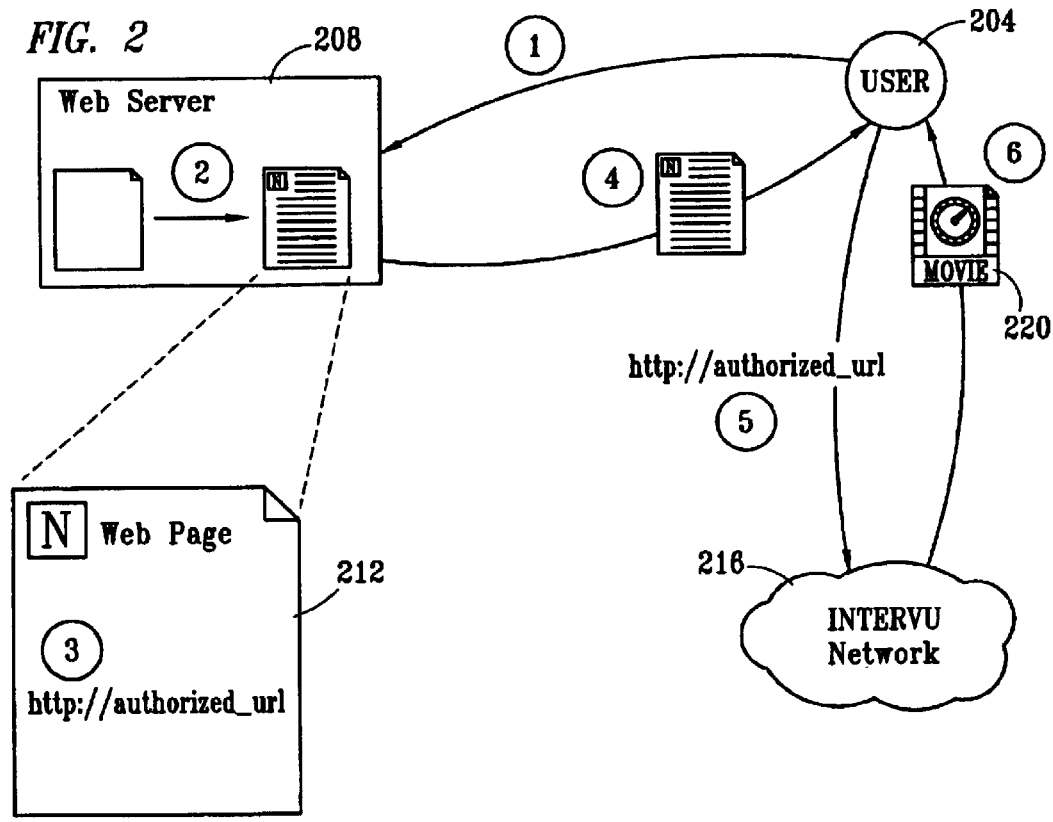

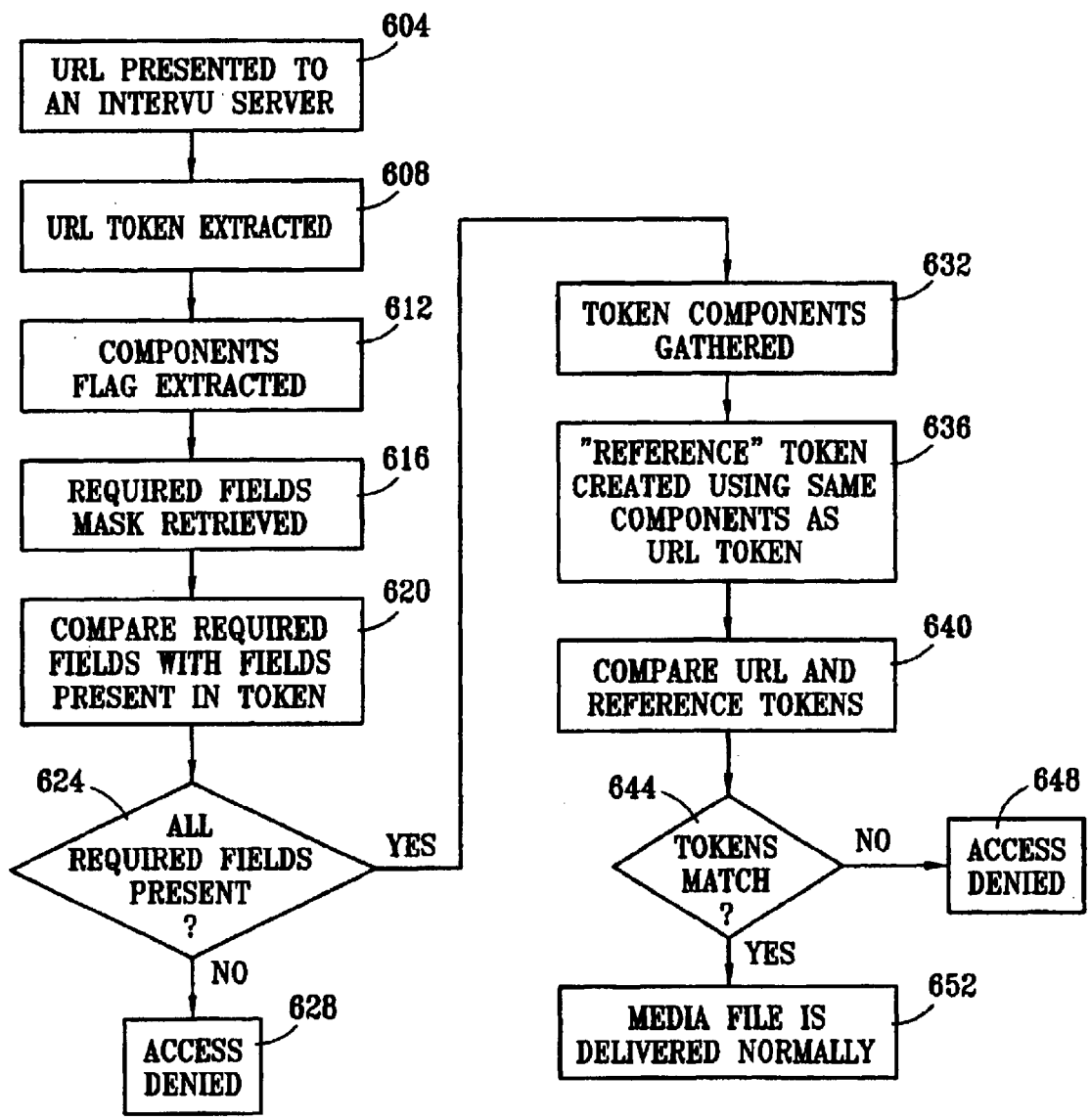

SYSTEM AND METHOD FOR PROVIDING CONTROLLED AND SECURED ACCESS TO NETWORK RESOURCES

The present invention relates to security for network resources, and more specifically to a system and method for controlling access to contents such as media files, pay-per-view websites, members-only sites, etc, on a network. The present invention allows a content owner (e.g., publisher) to deny access to unauthorized requests for content on a network.

BACKGROUND OF THE INVENTION

Multimedia content is increasingly being hosted on computer networks. For example, the Internet, which is a network of interconnected computers spread throughout the world, hosts a variety of multimedia content such as audio, video, text, graphics and other types of computer data.

Often, the owner of the content (e.g., publisher) hosts the content on its own computer server. However, in many instances, the publisher may let an independent third party manage or maintain the content in the third party's computer server. The computer server may be linked to a network, e.g., the Internet.

While users have unrestricted access to some content on the Internet, others however have restricted access. The content owner may need to restrict access to its content to only authorized users for commercial reasons. A publisher of a newsletter on the Internet, for example, may wish to grant access to only subscribing users. A pay-per-view website publisher needs to ensure that only subscribing customers have access to the contents.

A website publisher may wish to prevent piracy on its site. For example, a publisher may wish to ensure that no other website can place links to a client's content on its pages. A pirate website may try to link directly to a movie clip from its own page and sell its advertising around it.

Thus, a publisher needs to control access to its content on the network by ensuring that only authorized users have access to the content. The publisher needs the ability to deny access to unauthorized requests for content on a network that may be managed by a third party.

SUMMARY OF THE INVENTION

The present invention is directed to a system and method for controlling access to content on a network computer. The computer may be a stand-alone single server computer or part of a distributed computer network that is connected to the Internet, intranet, or any other network. The present invention provides a means for a publisher or an owner of content to control access to the content even on a distributed network, i.e., multiple computers storing and providing access to the content.

According to the present invention, a user initially receives a token from the publisher or the owner. A content server then receives the token from the user. The content server is configured to recognize requests for content that requires authentication, process the token, and verify the validity of the token. If the token is valid, the server delivers the content to the user. If the token is invalid, the server denies the user access to the content. The present invention provides secured access to restricted contents, such as, for example, pay-per-view websites and movies, and members-only content in an efficient way.

In one embodiment, the method for providing security for network resources by controlling the delivery of a file from a network computer comprises receiving a token from a publisher, the token included in an authenticated URL, requesting content from the network computer by presenting the token, checking the validity of the token at the network computer, delivering, from the network computer, the file if the token is valid, and denying access to the file if the token is invalid.

The method further comprises the steps of clicking onto an authentication-required web page, entering a username and a password in a dialog box, checking the validity of the username and the password, presenting a web page containing the authenticated URL if the username and the password are valid, and denying access to the file if the username and the password are invalid.

The method further comprises the steps of clicking onto a link for a payment-required web page, providing credit card information into a form, processing a transaction using the credit card information, presenting a web page containing the authenticated URL if the transaction is successful, and denying access to the file if the transaction is unsuccessful.

The method further comprises the steps of extracting the token from the authenticated URL, and extracting component flags and required mask fields from the token. The method further comprises the steps of comparing the components indicated by the component flags with the required mask fields, creating a reference token using same component as in the authenticated URL, comparing the token with the reference token, delivering the file if the tokens match, and denying access to the file if the tokens do not match.

BRIEF DESCRIPTION OF THE DRAWINGS

In the drawings, like reference numbers generally indicate identical, functionally similar, and/or structurally similar elements. The drawings in which an element first appears is indicated by the leftmost digit in the reference number.

The present invention will be described with reference to the accompanying drawings, wherein:

FIG. 1 is a flow diagram of the method in accordance with one embodiment of the present invention.

FIG. 2 shows a user downloading a movie from a network computer.

FIG. 6 is a flow diagram of the steps for verifying a token by the server.

DETAILED DESCRIPTION OF THE INVENTION

Figure 3:
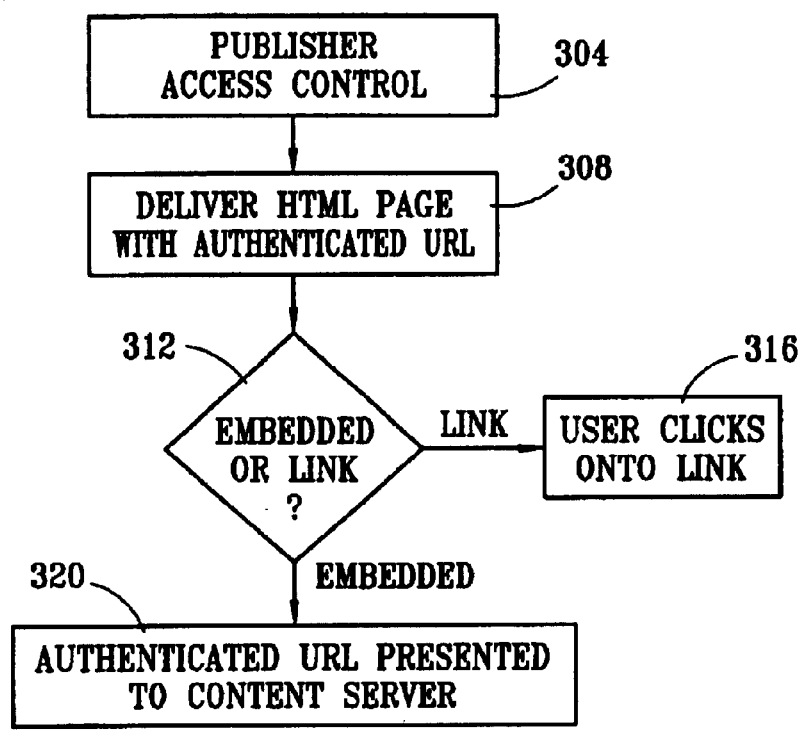
FIG. 3 illustrates the steps of acquiring an authenticated URL from a publisher.

The present invention provides a solution to the above-described problems. Briefly stated, the present invention is directed to a system and method for controlling access to "content" on a network computer. In this document, hereinafter the term content refers to computer files, such as audio, video, text, graphics or any other types of computer data files. The computer may be a stand-alone single server computer or part of a distributed computer network that is connected to the Internet, intranet, or any other network.

In one embodiment, the computer hosting the content may be managed or maintained by the owner or the publisher of the content. The present invention provides a means for the publisher or the owner to control access to the content even on a distributed network, i.e., multiple computers storing and providing access to the content.

In another embodiment, the computer hosting the content may be managed or maintained by an independent third party. While the publisher or the owner may engage a third party to store and manage the content on the third party's network, the present invention allows the owner or the publisher to retain control over access to the content.

According to the present invention, a user initially receives a token from the publisher. In one embodiment, the user acquires a token as part of his normal interaction with the publisher's website. The user, for example, may enter a publisher's website and click on a link to a web page containing an embedded video. The reference to the embedded video contains the token of which the user need not be aware. In some instances, the user may be informed of the existence of the token and the fact that he needs to acquire a token in order to have access to restricted content. In other words, the user may or may not be aware of the fact that he has received a token as part of his normal interaction with the website.

A content server then receives the token. In this document, the term content server refers to a computer that stores and maintains content, has the ability to receive requests for content and can deliver content to users. The content server is configured to recognize requests for content that requires authentication, process the token, and verify the validity of the token. If the token is valid, the server delivers the content to the user. If the token is invalid, the server denies the user access to the content.

The present invention provides secured access to restricted contents, such as, for example, pay-per-view websites and movies, and members-only content in an efficient way. In addition, it can be used to prevent "deep linking." For the purposes of this document, the term "deep linking" refers to the act of linking to resources deep inside another website without that website's permission. For example, a third party website could use graphics, movies or audio from another website in such a way so that they appear to be a part of the third party's website, yet are still served from the original source website. This forces the source website to bear the expenses of maintaining and serving the content without deriving any benefit.

FIG. 1 is a flow diagram of the method in accordance with one embodiment of the present invention. In step 104, a user receives a token from a publisher of the content. In one embodiment, the token is included in a URL that is presented to a user as part of a normal HTML page. The URL with the token in referred to as an authenticated token in the document. The construction of the token will be described later in more detail. The website publishers can screen the user before granting the authenticated URL.

In step 108, the authenticated URL is presented to a server. In step 112, the server checks the validity of the token. In one embodiment, the server knows the required authentication information and matches it with the information in the token. The authentication information is described later in details. The server is typically authentication-enabled and has a special software code, which compares the token with user information.

The user typically does not make the request for content himself. Rather, an agent such as a web browser (e.g., Netscape Navigator) or a media player (e.g., Windows Media Player) makes the request on behalf of the user. A valid token is one that matches all of the required pieces of authentication information. Any required piece of information that does not match causes the token to be invalid.

In step 116, it is determined if the token is valid. If the token is valid, a media file is delivered to the user in step 124. The media file delivery proceeds from this point without any further participation from the authentication system. If, however, the token is invalid, in step 120, access is denied to the user and the user is notified as such. The user can be notified by a simple "access denied" message, or a more elaborate video presentation explaining why access was denied and offering to help how to resolve the situation.

A token includes a list of components that will be described later. A few example tokens are listed below.

(i) adI0Ex8GsIkp5Q (ii) abpo3R1 OUVq9UN6

(iii) acKLJ1w2m3EtQY

A token is attached to a URL string of a requested file and it becomes an integral and required part of the URL string. The combined URL and the token is referred to as the authenticated URL. The user then presents the authenticated URL to the server to download a desired file. Following are examples of a URL and a token.

URL: http://tm.intervu.net/smirror/chuck/auth/file0.1.html?
Token: auth=adI0qEx8GsIkp5Q When the token is added to the URL, an authenticated URL is created. An authenticated URL is shown below:

http://tm.intervu.net/smirror.chuck,/auth,file
01.html?adI0qEx8Gslkp5Q

FIG. 2 shows a user downloading a movie from a network server. Referring now to FIG. 2, a user 204 requests a web page from an authentication-enabled web server 208. In one embodiment, the web server 208 is managed by a publisher or a publisher's client. The publisher wishes to retain control over access to the movie. The actual movie, however, is stored in a network server that is managed by a third party. The third party onlv allows access to users that have received valid tokens.

The web server 208 generates an HTML page (e.g., a web page) 212 for the user 204. A token is created at this point and embedded in the web page 212. The web page 212 contains a link (a URL) to an authentication-required media file on the network. The URL contains an embedded token that has been created for the specific user making the request.

The server 208 returns the web page 212 to the user. The user then uses the authenticated UJRL to make a request for a media file (i.e., movie) to a network server 216. In one embodiment, this can occur immediately when the HTML page loads (if a media clip is embedded into the web page), or it can occur when the user clicks on a link on the HTML page. The network server 216 then returns the movie 220 to the user. The user 204 then uses a media player to play the movie.

FIG. 3 illustrates in further detail the steps of acquiring an authenticated URL from a publisher. In step 304, a publisher determines if a user ought to be granted access to its content. Note that the content (e.g., a movie) can be stored in a separate server on a network that is managed by a third party. The publisher however retains control over access to the content by deciding who should be granted a token.

In step 308, the publisher delivers an HTML page containing an authenticated URL to the user. In step 312, it is determined if a media clip is embedded in the HTML page or if the page contains a link to the server. If the page contains a link to the server, in step 316 the user clicks on the link and the authenticated URL is then presented to the server in step 320. If the HTML page has an embedded media clip, then the URL is automatically presented to the server.

Figure 4:
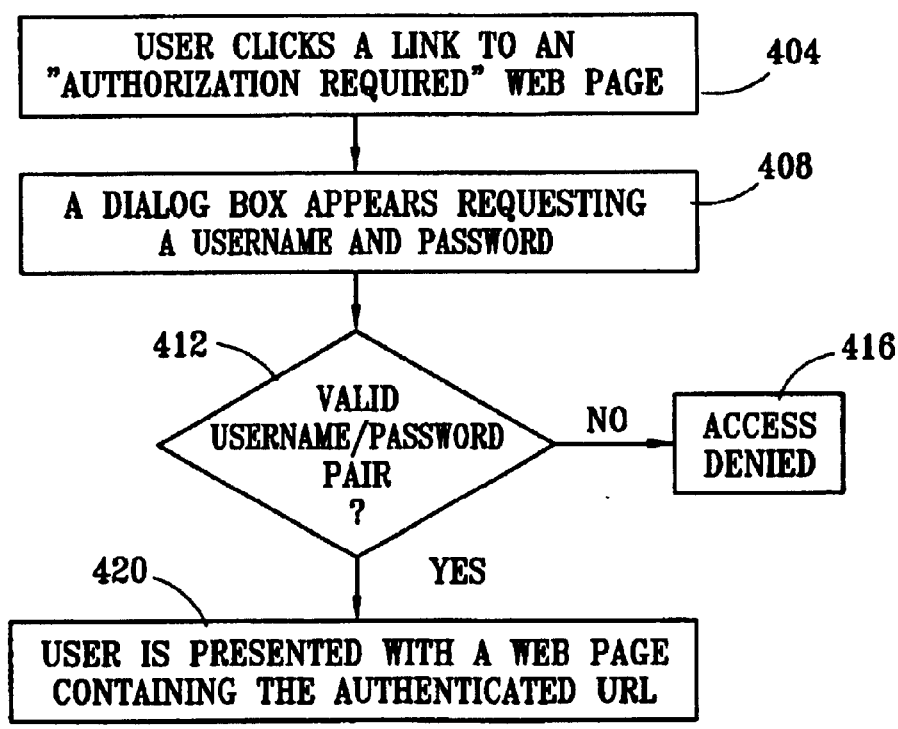
FIG. 4 is a flow diagram of the steps of acquiring an authenticated URL using a username and a password.

There are several different ways by which a user can acquire an authenticated URL from a publisher. FIG. 4 is a flow diagram of the steps of acquiring an authenticated URL using a username and a password. In step 404, a user clicks on an "authentication required" web page. In step 408, a dialog box appears requesting a username and a password. In step 412, the system verifies if the username/password pair is valid. If the username/password pair is invalid, then access is denied to the user in step 416. If the username/password pair is valid, then the user is presented with a web page containing an authenticated URL, in step 420. The user then uses the authenticated URL to download content from a server.

The user may acquire a "cookie" from another source that can be used to acquire an authenticated URL. In that case, the user presents the cookie to the publisher and requests an authenticated URL. The publisher checks if the cookie is valid or not. If the cookie is valid, the publisher presents an authenticated URL to the user.

Figure 5:
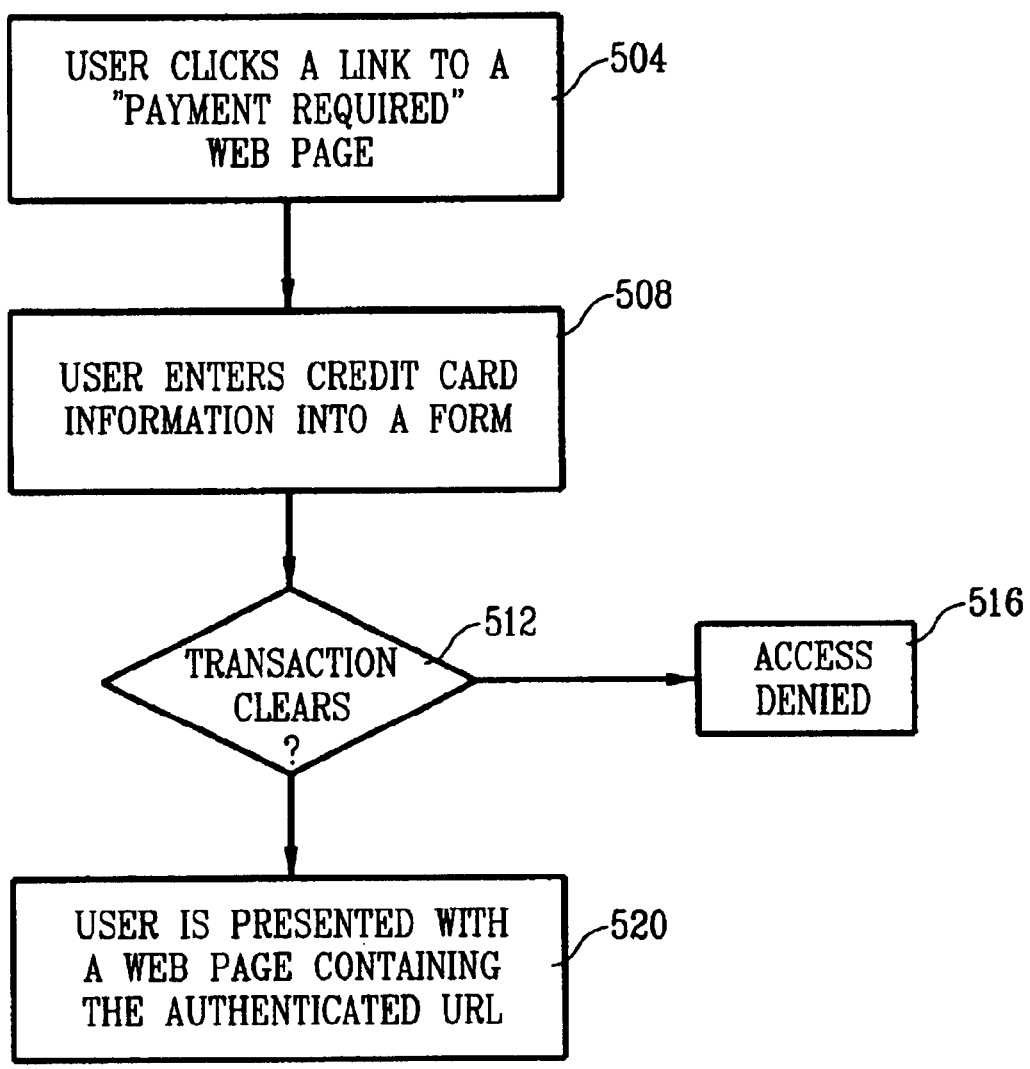
FIG. 5 is a flow diagram of the steps of acquiring an authenticated URL for a pay-per-view site.

FIG. 5 is a flow diagram of the steps of acquiring an authenticated URL for a pay-per-view site. In step 504, a user clicks to a "payment required" web page. In step 508, the user enters his credit card information into a form. In step 5 12, the system processes the transaction. If the transaction clears, then in step 520 the user is presented with a web page containing an authenticated URL. If the transaction does not clear, in step 516 the user is denied access.

As noted before, after a user acquires a token from a publisher, the user presents the token to a server that has the desired content, e.g., a media file. The server then verifies the token, and if the token is valid, the media file is delivered to the user. FIG. 6 is a flow diagram of the steps required in verifying a token by the server. In step 604, the authenticated MARL is presented to the server that has the content. In step 608, the token is extracted from the authenticated URL. In step 612, the components field is extracted from the token. A components field indicates what component (authentication information) is present in the token. For example, the components field may indicate that only the user's IP address and a publisher password are present in the token. The components in the components field are also referred to as the authentication information.

In step 616, required components mask ("mask") is retrieved from the token. The mask indicates the minimum number of components required for access. A components field, however, may indicate that a token has more than the minimum required components. In other cases, a token may have the exact number of components. If a token, however, has less components than the minimum number of components required, then access to the user will be denied.

In step 624, the mask is compared with the components field. In step 628, it is determined if all required components are present in the token. If the required components are not present, the user is denied access in step 628.

If the required components are present, the token components are gathered in step 632. In step 636, a reference token is created independently by the server. Consider, for example, a token has the following components:

(1) URL
(2) IP address of the user
(3) Time Window

The server independently obtains the URL, the IP address and the Time and creates a reference token in order to ensure that the token presented in the authenticated URL is valid. For example, the server obtains the time from its local clock. The server obtains the URL and the IP address from the connection. Thus, the server can create a reference token independently that should match with a correct token having the same components.

In step 640, the reference token is compared to the token presented by the user. In step 644, it is determined if the tokens match. If the tokens match, then in step 652, the media file is delivered to the user. If the tokens do not match, the user is denied access in step 648.

Structure of a Token

In one embodiment, a token is a string of bytes, which can be interpreted as ASCII characters and has the following general structure:

| Byte(s) | Purpose |
| --- | --- |
| 1 | Version |
| 2-N | Version-specific components. |

The details of the token after the first byte are completely dependent on the version number given in the first byte and may look very different from one version to the next.

Since URLs have a very limited valid character set, numeric values cannot be represented directly in their binary form. In one embodiment, all numbers are encoded in a base-64 interpretation. This base-64 implementation uses an "alphabet" of the letters 'a' through 'z' followed by 'A' through 'Z' then by '0' through '9', and finally the characters '.' and '_', represented by the string "a–zA–Z0–9._". Together, they make up the 64 characters in the base-64 number system.

In one embodiment, the version number is zero, which is represented in the base-64 system by a lower-case 'a'. Therefore, all version 0 tokens will begin with the letter 'a'. Other versions are allowed, and in one embodiment, they can be indicated by the letters 'b'. 'c', 'd'. etc.

In one embodiment, the structure of a version zero token is as follows:

| Byte(s) | Purpose |
| --- | --- |
| 1 | Version |
| 2 | Components Field |
| 3–15 | Encryption Digest |
| 16–end | Payload component(s), if necessary. |

The first byte is the version field, as discussed above. The second byte is the components field, which indicates the components used to create the token. The third through 15th bytes are an encryption digest of encryption components used to create the token. Any bytes beyond the 15th character are payload components. Payload components may be required as part of tokens. The payload component may be zero bytes long if no payload components are required.

Components Field

For a version 0 token, the components field is interpreted as a bit-field of individual selectors, each bit corresponding to a particular component that may be included in a token. Each bit can have the value zero or one. A value of one means that the bit is "set" and indicates the presence of the designated token component. A value of zero means that the indicated component is not a part of the token.

The version 0 components field looks like this:

| Bit Position | Component Indicated |
| --- | --- |
| 0 | IP Address |
| 1 | File path (sometimes referred to as the URL) |
| 2 | Password |
| 3 | Referer ID |
| 4 | Time Window |
| 5 | Unused |
| 6 | Unused |
| 7 | Unused |
| 8 | Unused |

A bit being set (having a value of one) indicates that the component is included in the token encryption digest.

For example, a token that includes the components IP address, Referer ID and Time Window would have the 0, 3 and 4 bits set. Written in the traditional way, with the "zero-th" bit to the right, this would look like this:

000011001

In the base-64 number system, this would be the letter.

Required Components Mask

In one embodiment, a required components mask (the "mask") has a structure identical to the components field, except the meaning is slightly different. A bit set in the required components mask means that the indicated component is required to be a part of any valid tokens.

For example, suppose the mask indicates that the password is required. Any candidate token must include the password (as indicated in the components field) or else it is not a valid token.

Using the example above, suppose the required components mask looks like '000011001'. If a token arrives with a components field that looks like '00011000' access will be denied (i.e., authentication will fail) because the IP address (indicated by bit position 0, the right-most bit) is required by the required components mask but not included in the token.

If a token arrives with a components field that looks like '00011011', access will be granted (i.e., authentication will succeed) because all of the required fields are present in the token. The presence of additional, non-required components does not cause authentication to fail. It should be understood that the required components mask and the components field can be constructed in other ways that will become apparent to those skilled in the art.

Comparing bit-fields in this manner is commonly known as "masking" to those skilled in the art.

In one embodiment, a token encodes following components:

(i) User's IP address. The User's IP Address allows the publisher to restrict access to content to specific users authorized by the publisher;

(ii) URL: The URL allows the publisher to limit access to some content, even if the user'is a valid user of other content.

(iii) Valid Time Window: The Valid Time Window allows the publisher to limit the lifespan of a valid token.

(iv) Authorizing Publisher. The Authorizing Publisher allows tracking of usage by referring URL.

(v) Publisher Password: The Publisher Password prevents a valid publisher from using another publisher's content without prior authorization.

(vi) Publisher-Specific Payload: The Payload allows the publisher to communicate additional information along with a token. This information can be used for many purposes, such as, for example, a publisher-specific customer ID that can be reconciled against the publisher's data at a later time.

A token can include other information (components) also. A token can include any combination of the above-listed components based on the needs of a publisher. Thus, a token, for example, may include one or more of the above listed components.

A publisher, for example, can establish strict scrutiny on content. A publisher can include all of the above-listed components in a token and thus prevent users from passing around URLs to their friends, preventing websites from linking to content, preventing hackers from gaining access to content, and preventing URLs from being used beyond a user's authorized time window. If the security needs of a publisher are more modest, it may choose from the available components to, for instance, simply ensure that all links to its content come from its own website by using the publisher's password.

The present invention is protocol neutral. The token is attached to the URL, and it does not require any modification for any particular format. The present invention is compatible with various media players such as Real Player, Quicktime, etc.

While various embodiments of the present invention have been described above, it should be understood that they have been presented by way of example only, and not limitation. Thus, the breadth and scope of the present invention should not be limited by any of the above-described embodiments, but should be defined only in accordance with the following claims and their equivalents.

What is claimed is:

1. A method for controlling access to content on a network computer and denying access to unauthorized users, the method comprising the steps of:

obtaining a token from a publisher server, said token included in an authenticated URL and including a set of one or more authentication components, the set of authentication components including at least a valid time window value that allows the publisher server to control a lifespan of the token, wherein the step of obtaining the token comprises the steps of:

clicking onto an authentication-required page;

entering a username and a password in a dialog box;

checking the validity of the username and the password;

delivering a page containing the authenticated URL if the username and the password are valid;

requesting content from the network computer by presenting said token; checking the validity of said token at the network computer, wherein the validity of said token is checked by first determining whether the set of authentication components are present in the token; and delivering, from the network computer, the file only if the token is valid.

2. The method according to claim 1, wherein said token further comprises a user's IP address that allows the publisher to restrict access to a specific user authorized by the publisher.

3. A method for controlling access to content on a network computer and denying access to unauthorized users, the method comprising the steps of:

obtaining a token from a publisher server, said token included in an authenticated URL and including a set of one or more authentication components, the set of authentication components including at least a valid time window value that allows the publisher server to control a lifespan of the token, wherein the step of obtaining the token comprises the steps of:
clicking onto a link for a payment-required page;
providing credit card information into a form;
processing a transaction using the credit card information;
presenting a page containing the authenticated URL if the transaction is successful;
requesting content from the network computer by presenting said token; checking the validity of said token at the network computer, wherein the validity of said token is checked by first determining whether the set of authentication components are present in the token; and delivering, from the network computer, the file only if the token is valid.

4. The method according to claim 3 wherein said token further comprises a value that allows a publisher to selectively limit a user's access to content.

5. A method for controlling access to content on a network computer and denying access to unauthorized users, the method comprising the steps of:
receiving a token from a publisher server, said token included in an authenticated URL and including components;
requesting a file from the network computer by presenting said token;
checking the validity of said token at the network computer, by the following steps; and
extracting the token from the authenticated URL;
extracting component flags from the token;
extracting required mask fields from the token;
comparing the required mask fields to the component flags in the token;
creating a reference token independently using the same components as used in the URL token; and
comparing the URL token with the reference token;
delivering the file from the network computer only if the URL token matches the reference token; and
denying access to the file if the URL token does not match the reference token.

6. The method according to claim 5, wherein said token allows tracking of usage by a referring URL.

7. The method according to claim 5, wherein the network computer is linked to the internet.

8. A method for controlling access to content on a network computer and denying access to unauthorized users, the method comprising the steps of:
receiving a token from a publisher server, said token included in an authenticated URL and including a set of one or more authentication components, the set of authentication components including at least a valid time window value that allows the publisher server to control a lifespan of the token;
requesting content from the network computer by presenting said token; checking the validity of said token at the network computer, wherein the validity of said token is checked by first determining whether the set of authentication components are present in the token; and delivering, from the network computer, the file only if the token is valid;
wherein the network computer is maintained by a third party who is not the publisher.

9. The method according to claim 8, wherein the authenticated URL is contained in an HTML page.

10. The method according to claim 8, wherein the file is a video file.

11. The method according to claim 8, wherein the file is an audio file.

12. The method according to claim 8, wherein the file is a text file.

13. The method according to claim 8, wherein the file is a graphics file.

14. The method according to claim 8, wherein the file is a movie.

* * * * *